United States Patent [19]

Sato et al.

[11] 3,715,801

[45] Feb. 13, 1973

[54] TOOL CHANGER FOR MACHINE TOOL

[76] Inventors: Yoshikazu Sato, No. 1,026, 4-chome, Shimotakaido, Suginami-ku, Tokyo; Makoto Sato, No. 1-10, 1-chome, Nakano, Nakano-ku, Tokyo, Japan

[22] Filed: March 4, 1969

[21] Appl. No.: 804,220

[52] U.S. Cl. ........................................29/568, 29/26 A
[51] Int. Cl. ................................................B23q 3/157
[58] Field of Search..............................29/568, 26 A

[56] References Cited

UNITED STATES PATENTS

| | | | |
|---|---|---|---|
| 3,242,568 | 3/1966 | Flannery et al. | 29/568 |
| 3,355,797 | 12/1967 | Lohneis | 29/568 |
| 3,355,798 | 12/1967 | Drechsler | 29/568 |
| 3,414,967 | 12/1968 | Erikson | 29/568 |

*Primary Examiner*—Andrew R. Juhasz
*Assistant Examiner*—Z. R. Bilinsky
*Attorney*—Jay M. Cantor

[57] ABSTRACT

A tool changing mechanism for a machine tool having a horizontal spindle. A rotatable magazine is provided with a plurality of guides for supporting and guiding a plurality of tool cartridges. Each cartridge is provided with a plurality of vertically aligned tools. The magazine is indexed to align a selected cartridge with a transfer station. The cartridge is shifted into the transfer station and is positioned to present a selected tool to a transfer mechanism for removal of the tool and insertion into the spindle. The tool is returned to the cartridge by the transfer mechanism after use. A tape controlled motor means coordinates the operation of magazine, cartridges, and transfer mechanism to provide for returning one tool while another tool is operating on the work.

6 Claims, 6 Drawing Figures

INVENTORS
YOSHIKAZU SATO
MAKOTO SATO

BY Harold L. Halpert

AGENT

INVENTORS
YOSHIKAZU SATO
MAKOTO SATO

BY Harold L. Halpert

AGENT

TOOL CHANGER FOR MACHINE TOOL

This invention relates to a machine tool and more particularly to a tool changing mechanism therefor.

It is an object of this invention to provide a tool changing mechanism that has a large tool storage capacity and is small in size.

It is a further object of this invention to provide a tool changing mechanism as aforesaid that is automatically controlled by coded tape for selecting the tools in proper order from storage.

It is a further object of this invention to provide a tool changing mechanism as aforesaid comprising a simple mechanism that can be easily manufactured at low cost and will operate reliably for long periods of time.

Figure 1:
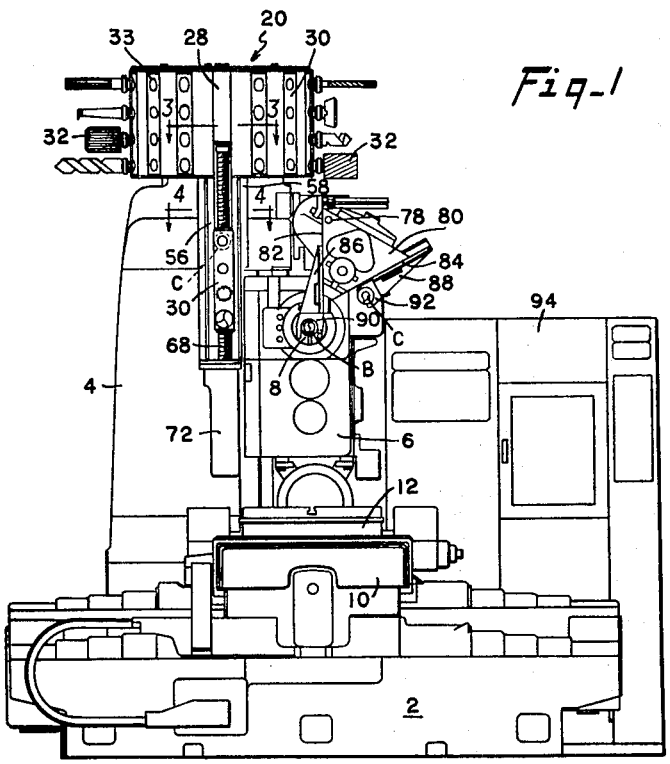
Figure 3:
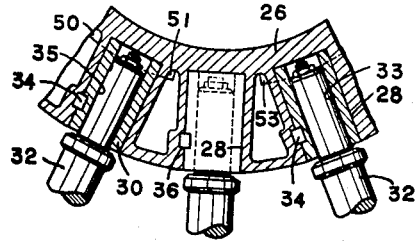
Figure 4:
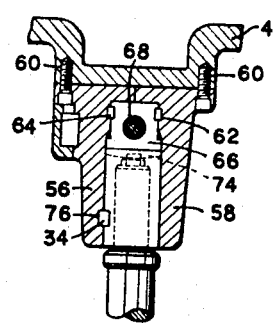
Figure 2:
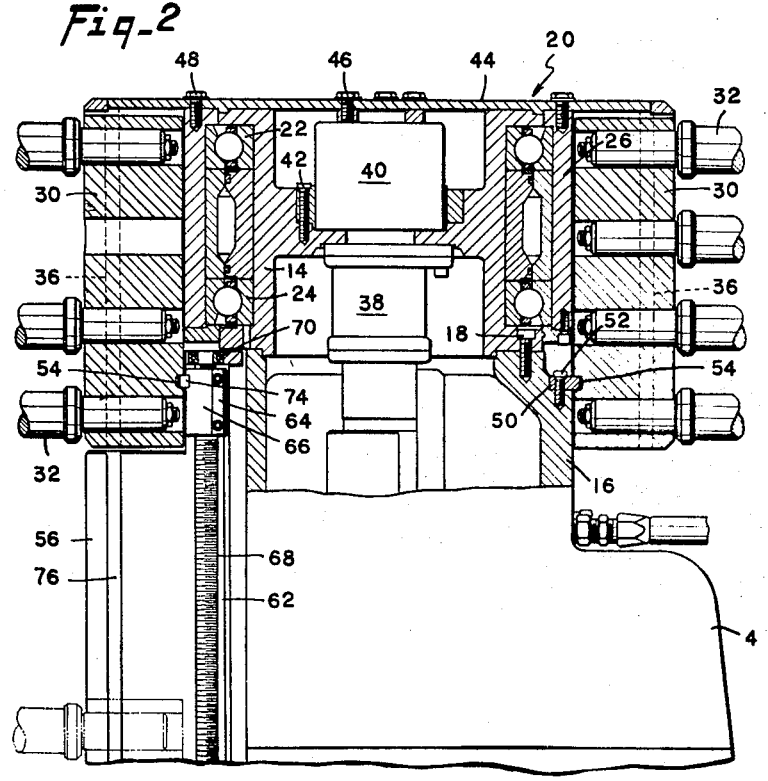
Figure 6:
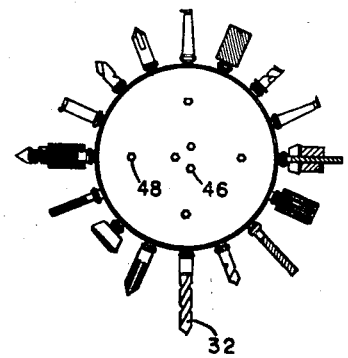
Figure 5:
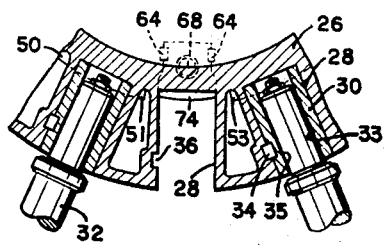

These and other objects of the invention will become manifest upon reading the following description in conjunction with the accompanying drawings wherein:

FIG. 1 is a view in elevation showing the tool changing mechanism mounted on a machine tool, FIG. 2 is an enlarged view partly in section showing details of the tool changing mechanism, FIG. 3 is a segmental view partly in section taken along the line 3—3 of FIG. 1, FIG. 4 is a view partly in section taken on the line 4—4 of FIG. 1, FIG. 5 is a view similar to FIG. 3 with the tool cartridge removed, and FIG. 6 is a plan view of the magazine.

With reference to the drawings there is disclosed a bed 2 having secured thereto a column 4 for mounting the tool changing mechanism and a spindle head 6 which carries the tool spindle 8 and the driving transmission for controlling the rotation of the spindle. The spindle head is mounted for vertical movement along slides carried by the column and is driven to the desired vertical position by a power operated lead screw. A work table 10 is mounted for movement in mutually perpendicular directions, normal and transverse to the axis of sliding of the spindle head. An index table 12 is removably mounted on the work table for supporting a work piece.

A mounting cylinder 14 is secured to an extension 16 of the column 4 by bolts 18. A tool storage magazine 20 is rotatably mounted on the cylinder 14 by anti-friction bearings 22 and 24. The magazine comprises a cylinder 26 formed with a plurality of circumferentially spaced ways 28 for slidably mounting tool holding cartridges 30. Each cartridge removably stores a plurality of tools 32 for release and return by the tool changing mechanism to be described below and is retained in the way 28 by means of a key 34 secured to the cartridge and slidably mounted in a key way 36 in cylinder 26. Each tool is releasably retained in a recess 33 by a spring 35. A servo motor 38 is drivably secured to a reduction gear transmission 40 which is mounted in cylinder 14 by means of bolts 42. A plate 44 is secured to transmission 40 and cylinder 26 by screws 46 and 48 respectively, to rotate the cylinder.

A split retaining ring 50, having separated ends 51 and 53, is secured to extension 16 by bolts 52 and extends into a way 54 in each of the cartridges 30 to prevent vertical movement of the cartridges in ways 28 in all positions of rotation of the cylinder except in a transfer station, to be presently described, wherein a selected cartridge is removed from the magazine to position the desired tool for removal by the tool change mechanism for transfer to the tool spindle.

The transfer station comprises a pair of retaining member 56, 58 secured to column 4 by screws 60. Each casting is provided with a pair of key ways 62 for slidably guiding keys 64 secured to a nut 66. The nut is threadedly mounted on a threaded shaft 68 supported for rotation at the upper end by a bearing 70 and is attached at the lower end to be rotated by a servo pulse motor 72. A key 74 is secured to the nut and has a vertical depth equal to that of the ring 50 for engagement with the ways 54 of the cartridges and fits between ends 51, 53 when the cartridge is in a stored position in a way 28 and the nut is in the uppermost position. A key way 76 is formed in member 56 and is aligned with key way 36 to form a continuous guide for key 34 as the cartridge is moved from the storage position in a way 28 to the transfer station between guide members 56, 58.

A tool changing mechanism for removing and returning the tools stored in a cartridge is mounted on column 4 above the spindle head 6 on a pivot 78 to pivot in a plane normal to the main tool spindle 8 and for sliding along the pivot to move parallel to spindle 8. The body 80 of the mechanism is provided with a pair of converging ways 82 and 84 for slidably supporting tool changing arms 86 and 88 containing claws 90 and 92 for grasping the tools. Arm 86 and claw 90 remove the used tool and arm 88 and claw 92 mount the new tool.

Changing arm 86 for used tool changing, grasps the used tool B, and places it into a designated recess in the cartridge which is locked into the transfer position.

Changing arm 88 for new tool changing, grasps the new tool C for cartridge 30 and by motion of the tool changing mechanism bodily along the axis of the tool spindle removes tool C completely from the cartridge then by swiveling along the plane perpendicular to the axis with pivot 78 as its axis and by motion of arm assembly 88 along the side of tool changing mechanism body 80, positions new tool "C" to coincide with the axis of main tool spindle 8, the above series of motions of the tool changing mechanism is controlled in sequence with the tool changing operation of the machine tool by means of data tape control mechanism 94.

The invention as described above comprises a rotatable tool-cartridge holding magazine 20 rotated by the servo motor 38 through gear train 40, whereby magazine 20 holding a cartridge 30, containing new tool "C" is positioned at the transfer station, a locking device comprising a way 54 on the lower back side of the cartridge engages key 74 of nut 66 which fits lead screw 68 driven by the servo motor 72 to lower the cartridge to the designated transfer position. The new tool "C" now being in a predetermined plane, the tool changing mechanism 80 is turned on pivot 70 until the claw 92 of the new tool changing arm 88 is in the predetermined plane. The arm 88 is then moved along the way 84 of the mechanism 80 until the claw 94 grasps new tool "C" and, by forward movement of the mechanism 80 and arm 88 along the pivot 78 parallel to the axis of spindle 8, the new tool is removed from the cartridge. The arm 88 is now moved backward along the way 84 and the mechanism 80 is rotated in a counter-clockwise direction until arm 86 is directly over the axis of spindle 8, the arm and claw 90 being in lowered position along its way 82. The mechanism 80 with the arms 86, 88 is now moved rearwardly along the axis of pivot 78. When the machining operation is completed, the spindle head rises a designated amount and changing arm 86, positioned as described above, grasps tool "B" by means of grasping claw 90 after which the changing mechanism is moved bodily outwards along the axis of the main spindle 8 to remove tool "B" from the main spindle. Arm 86 is now raised by moving along the way 82 of the mechanism, simultaneously arm 88 with new tool "C" is lowered on way 84 by moving towards the axis of the main spindle. When the tool is positioned on the axis, this sliding motion is stopped and the mechanism is moved bodily along the axis of pivot 78 with the tool along the axis of the main spindle to mount new tool "C" in the machine. On completion of this operation, arm 88 is returned along way 82 of the mechanism. Main spindle head 6 with new tool "C" mounted therein is lowered to perform the designated machining operation on the work mounted on index table 12. During the machining operation, the tool changing mechanism is moved forward parallel to the axis of the main spindle and rotated in a clock-wise direction and used tool changing arm 86 is slid forward to position the used tool "B" over vacant storage recess either in the cartridge from which the new tool was removed or in a different cartridge moved into the transfer position thereafter, the mechanism is moved backwards parallel to the axis of the tool spindle to deposit the used tool into the recess, after which arm 86 is returned along way 82.

New tool changing arm 88 which now is empty after mounting new tool "C" in the machine is now free to remove a different new tool from cartridge 30 by bringing another designated cartridge with a designated tool into the aforedescribed "transfer position" a new tool from a different cartridge can be selected.

As described above, this invention pertains to a method and apparatus comprised of a cartridge storage magazine which can be selectively rotated and which has mounted on its periphery a plurality of cartridges which can be moved into the proximity of the main tool spindle at a designated transfer station, and means for changing, by a tool changing mechanism, in the shortest possible time, a used tool mounted in the main spindle of the machine with a new tool held in the cartridge, whereby a plurality of different machining operations can be performed in a highly efficient manner, especially by arranging the cutting tools in the cartridges according to the sequence of the machining operations and thereby eliminating the necessity of changing cartridges until the full tool complement of a cartridge has been used and thus saving the time lost in removing a cartridge from the cartridge storing magazine. Also, the use of cartridges permits storing a large quantity of tools in small area, and the change-cycle can be shortened and its operation can be made accurate and positive.

What we claim is:

1. A tool changer for a machine tool having a rotatable spindle comprising a magazine for storing a plurality of cartridges, a plurality of tools mounted in each of said cartridges, means for shifting one of said cartridges from the magazine into a tool ready station, and means for transferring a selected tool from the said one of said cartridges in the tool ready station to the spindle for operating on a work piece, further including means for returning said selected tool from the spindle to the cartridge, wherein the means for transferring and returning the selected toll tool comprises a body having a pair of converging ways, tool grasping arms mounted on said ways, means mounting said body for oscillation between a first position in which said arms are over the cartridge and a second position in which the arms are over the spindle, and for shifting said body normal to the plane of oscillation in each of said positions, and means for shifting the cartridge in the tool ready station to position the selected tool for grasping by one of the tool grasping arms and means for shifting the cartridge in the tool ready station to position the cartridge for receiving a tool carried by the other of said grasping arms.

2. A tool changer as defined in claim 1 further including means for transferring said selected tool from the spindle to another one of said cartridges.

3. A tool changer as defined in claim 1 further including means for operating said returning means while another selected tool is operating on the work piece.

4. A tool changer as defined in claim 1 wherein the means for shifting said one of said cartridges from the magazine into the tool ready station and for positioning the cartridge in the tool ready station comprises a motor and data control means for operating said motor.

5. A tool changer as defined in claim 3 wherein the data control means comprises a tape controlled mechanism.

6. A tool changer as defined in claim 1 further including means for indexing the magazine to position a selected cartridge adjacent the tool ready station, said means for indexing, for shifting the cartridge, and for transferring and returning said selected tool comprising motor means and data control means for operating said motor means.

* * * * *